(12) United States Patent
Cha et al.

(10) Patent No.: US 10,401,679 B2
(45) Date of Patent: Sep. 3, 2019

(54) DISPLAY APPARATUS

(71) Applicant: SAMSUNG ELECTRONICS CO., LTD., Suwon-si, Gyeonggi-do (KR)

(72) Inventors: Yong Dok Cha, Suwon-si (KR); Jong Bin Kim, Suwon-si (KR); Jeong Shan Na, Hwaseong-si (KR); Young Chol Lee, Hwaseong-si (KR); Jae Hak Cho, Hwaseong-si (KR); Jean Hur, Seongnam-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 0 days.

(21) Appl. No.: 15/454,240

(22) Filed: Mar. 9, 2017

(65) Prior Publication Data
US 2017/0261813 A1 Sep. 14, 2017

(30) Foreign Application Priority Data
Mar. 9, 2016 (KR) .................. 10-2016-0028281

(51) Int. Cl.
*G02F 1/1333* (2006.01)
*G02F 1/1335* (2006.01)

(52) U.S. Cl.
CPC .. *G02F 1/133605* (2013.01); *G02F 1/133308* (2013.01); *G02F 1/133606* (2013.01); *G02F 1/133615* (2013.01); *G02F 2001/13332* (2013.01); *G02F 2001/133314* (2013.01)

(58) Field of Classification Search
CPC ......... G02F 1/133605; G02F 1/133308; G02F 1/133606; G02F 1/133615

USPC ........................................................ 362/97.1
See application file for complete search history.

(56) References Cited

U.S. PATENT DOCUMENTS

| 6,332,690 B1* | 12/2001 | Murofushi | ........ G02F 1/133305 349/64 |
| 6,449,439 B1* | 9/2002 | Boyd | ................... G02B 5/0242 348/333.01 |
| 7,980,746 B2* | 7/2011 | Tsuchiya | ................ G02B 6/003 362/606 |

(Continued)

FOREIGN PATENT DOCUMENTS

| KR | 10-2001-0043176 | 5/2001 |
| KR | 10-2012-0122642 | 11/2012 |

(Continued)

OTHER PUBLICATIONS

Extended Search Report dated Apr. 11, 2017 in counterpart European Patent Application No. 17153961.2.

(Continued)

*Primary Examiner* — Bryon T Gyllstrom
(74) *Attorney, Agent, or Firm* — Nixon & Vanderhye P.C.

(57) ABSTRACT

The display apparatus reflects the light emitted from the light source to a display panel using a reflective member without a member such as a light guide plate. The reflective member is configured so that the light emitted from the light source can be provided uniformly and introduced uniformly to the display panel. Even if a board with the light source disposed at a side of the reflective member, the light emitted from the light source can be radiated substantially uniformly to the entire area of the display panel by the reflective surface of the reflective member.

18 Claims, 6 Drawing Sheets

(56) References Cited

U.S. PATENT DOCUMENTS

| | | | | |
|---|---|---|---|---|
| 8,384,852 | B2* | 2/2013 | Biernath | G02F 1/133605 |
| | | | | 349/64 |
| 8,425,101 | B2* | 4/2013 | Boonekamp | F21V 7/0008 |
| | | | | 362/609 |
| 9,541,698 | B2* | 1/2017 | Wheatley | G02B 6/0046 |
| 2003/0048639 | A1* | 3/2003 | Boyd | G02B 6/0031 |
| | | | | 362/97.3 |
| 2006/0256578 | A1* | 11/2006 | Yang | G02B 6/0031 |
| | | | | 362/609 |
| 2007/0081361 | A1* | 4/2007 | Clary | G02B 6/0055 |
| | | | | 362/624 |
| 2010/0271843 | A1* | 10/2010 | Holten | F21V 7/0008 |
| | | | | 362/609 |
| 2010/0328578 | A1* | 12/2010 | Biernath | G02F 1/133605 |
| | | | | 349/64 |
| 2011/0134659 | A1* | 6/2011 | Aastuen | G02B 6/002 |
| | | | | 362/609 |
| 2014/0146521 | A1* | 5/2014 | Kim | G02F 1/133605 |
| | | | | 362/97.1 |

FOREIGN PATENT DOCUMENTS

| | | |
|---|---|---|
| KR | 10-2013-0070772 | 6/2013 |
| WO | 2011/114790 | 9/2011 |

OTHER PUBLICATIONS

European Search Report for EP Application No. 17153961.2 dated Jan. 17, 2019.

* cited by examiner

DISPLAY APPARATUS

CROSS-REFERENCE TO RELATED APPLICATION

This application is based on and claims priority under 35 U.S.C. § 119 to Korean Patent Application No. 2016-0028281, filed on Mar. 9, 2016 in the Korean Intellectual Property Office, the disclosure of which is incorporated by reference herein in its entirety.

BACKGROUND

1. Field

The present disclosure relates generally to a display apparatus having an improved backlight unit.

2. Description of Related Art

In general, a display apparatus is an apparatus for displaying an image and includes a monitor, TV and so on. A spontaneous light-emitting display panel such as an organic light-emitting diode (OLED) and a light-receiving display panel such as a liquid crystal display (LCD) panel are used in the display apparatus.

The present disclosure relates generally to the light-receiving display panel and includes a display panel configured with a liquid crystal panel to display an image and a backlight unit disposed at a rear side of the display panel.

The backlight unit includes a light-emitting diode as a light source for providing light to the display panel. When the light source is disposed at one side of the display panel, an optical loss may occur, and light may not be evenly radiated on an entire area of the display panel, and thus a brightness difference occurs on an entire screen.

SUMMARY

Therefore, it is an example aspect of the present disclosure to provide a display apparatus including a backlight unit in which light efficiency is enhanced using a reflection characteristic of light and a substantially uniform brightness is provided and of which a structure is simplified to enhance productivity.

Additional aspects of the disclosure will be set forth in part in the description which follows and, in part, will be apparent from the description.

In accordance with an example aspect of the present disclosure, a display apparatus is provided, the display apparatus including: a display panel and a backlight unit configured to provide light to the display panel. The backlight unit may include a board on which a plurality of light sources are arranged; a first reflection member comprising a first reflector configured to diffusely reflect light emitted from the plurality of light sources toward the display panel; and a second reflection member comprising a second reflector disposed between the first reflection member and the plurality of light sources and configured to regularly reflect the light emitted from the plurality of light sources toward the first reflection member.

The board may be inclined with respect to the display panel so that the plurality of light sources are directed toward the second reflection member.

The first reflection member may include a reflective surface that is concave toward the display panel.

The second reflection member may include a reflective surface that is concave toward the plurality of light sources.

The reflective surface of the second reflection member may have a parabolic curved-surface shape.

The second reflection member may be installed at the board.

The board and the second reflection member may be integrally formed with each other.

The backlight unit further may include a support configured to support the board, the first reflection member and the second reflection member.

One side of the second reflection member may be installed at the board, and the other side of the second reflection member may be coupled to the support member.

In accordance with an example aspect of the present disclosure, a display apparatus is provided, the display apparatus including: a display panel; a top chassis provided at a front of the display panel; a board disposed at a rear of the display panel and on which a plurality of light sources are arranged; a bottom chassis disposed at the rear of the display panel and including a first reflective surface configured to diffusely reflect light emitted from the plurality of light sources toward the display panel; and a reflection member comprising a reflector disposed between the first reflective surface and the plurality of light sources and including a second reflective surface configured to regularly reflect the light emitted from the plurality of light sources toward the first reflective surface.

The board may be disposed at one side of the first reflective surface and may be inclined, such that the plurality of light sources are directed toward the bottom chassis.

The board may be disposed at a lower side of the bottom chassis and disposed to be inclined, such that the plurality of light sources are directed toward a rear upper side.

The reflection member may be disposed at one side of the board, and the second reflective surface may be concave toward the plurality of light sources and the first reflective surface.

The second reflective surface may reflect at least a part of the light emitted from the plurality of light sources to be in parallel with the display panel.

The board and the reflection member may be installed at the bottom chassis.

The display apparatus may further include a support installed to protrude toward a front of the bottom chassis. The board and the reflection member may be installed at the support.

The support may be integrally formed with the bottom chassis.

In accordance with an example aspect of the present disclosure, a display apparatus is provided, the display apparatus including: a display panel; a top chassis provided at a front of the display panel; an optical sheet disposed at a rear of the display panel; a diffusion plate disposed at a rear of the optical sheet; a backlight unit disposed at a rear of the diffusion plate; and a bottom chassis disposed at a rear of the backlight unit. The backlight unit may include a board on which a plurality of light sources are arranged; a first reflection member comprising a first reflector configured to diffusely reflect light emitted from the plurality of light sources toward the diffusion plate; and a second reflection member comprising a second reflector disposed between the first reflection member and the plurality of light sources and configured to regularly reflect the light emitted from the plurality of light sources toward the first reflection member.

The board may be disposed to be inclined, such that the plurality of light sources are directed toward the second reflection member. The first reflection member may include a first reflective surface that is concave toward the diffusion plate. The second reflection member may include a second reflective surface that is concave toward the plurality of light sources and the first reflection member.

The second reflection member may reflect at least a part of the light emitted from the plurality of light sources to be in parallel with the diffusion plate, and the first reflection member may reflect the light emitted from the plurality of light sources and the light reflected by the second reflection member toward the diffusion plate.

BRIEF DESCRIPTION OF THE DRAWINGS

These and/or other aspects, features and attendant advantages of the present disclosure will become more apparent and readily appreciated from the following detailed description, taken in conjunction with the accompanying drawings, in which like reference numerals refer to like elements, and wherein.

DETAILED DESCRIPTION

Figure 1:
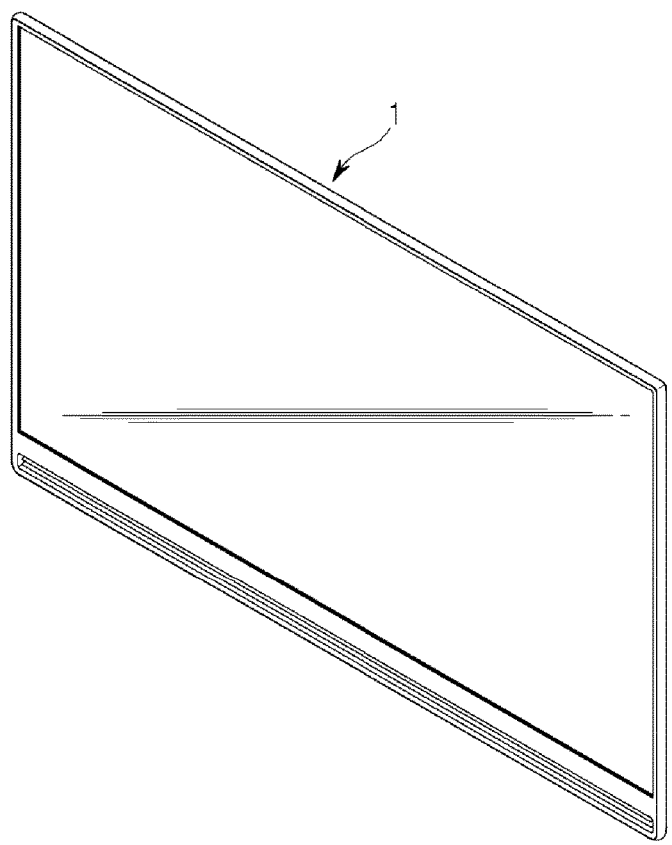
FIG. 1 is a perspective view illustrating an example display apparatus according to an example embodiment of the present disclosure.

The various example embodiments described herein are merely examples for the purpose of illustrations only, and are not intended to limit the scope of the disclosure, so other equivalents and modifications could be made thereto without departing from the spirit and scope of the disclosure.

Also, it should be noted that the same reference numerals or symbols are used to designate components or elements substantially having the same function.

The terms used herein are merely to describe a specific embodiment, and do not limit the present disclosure. Further, unless the context clearly indicates otherwise, singular expressions should be interpreted to include plural expressions. It is understood that terms "comprises," "comprising," "includes" or "has" are intended to indicate the presence of features, numerals, steps, operations, elements and components described in the specification or the presence of combinations of these, and do not preclude the presence of one or more other features, numerals, steps, operations, elements and components, the presence of combinations of these, or additional possibilities.

Terms including ordinal numbers such as "first," "second," etc. can be used to describe various components, but the components are not limited by those terms. The terms are used merely for the purpose of distinguishing one component from another. For example, a first component may be called a second component, and similarly, a second component may be called a first component without departing from the scope of rights of the disclosure. The term "and/or" encompasses combinations of a plurality of items or any one of the plurality of items.

Hereinafter, example embodiments of the present disclosure will be described in greater detail with reference to the accompanying drawings.

A "front surface" and a "front" used herein may indicate a direction toward a front surface and a front seen forward from a display apparatus 1 illustrated in FIG. 1, and a "rear" may indicate a direction toward a rear of the display apparatus 1.

The present disclosure will be described with a flat display apparatus 1 as an example and may also be applied to a curved surface display apparatus or a flexible display apparatus in which a curve surface state and a flat state can be varied.

Also, the present disclosure can be applied to all kinds of display apparatuses 1 regardless of a size of a screen thereof. For example, the present disclosure can be applied to a product, such as a smart TV and a monitor, which may be installed at a table, a wall, a ceiling or the like, or a portable product such as a tablet, a notebook, a smart phone and an e-book, or the like, but is not limited thereto.

Also, a plurality of light sources of a backlight unit are provided in the following description, and if necessary, it may be referred to as a "light source" or a "plurality of light sources". However, a fact that the plurality of light sources are arranged on a light source board according to one embodiment of the present disclosure is unchanged.

Figure 2:
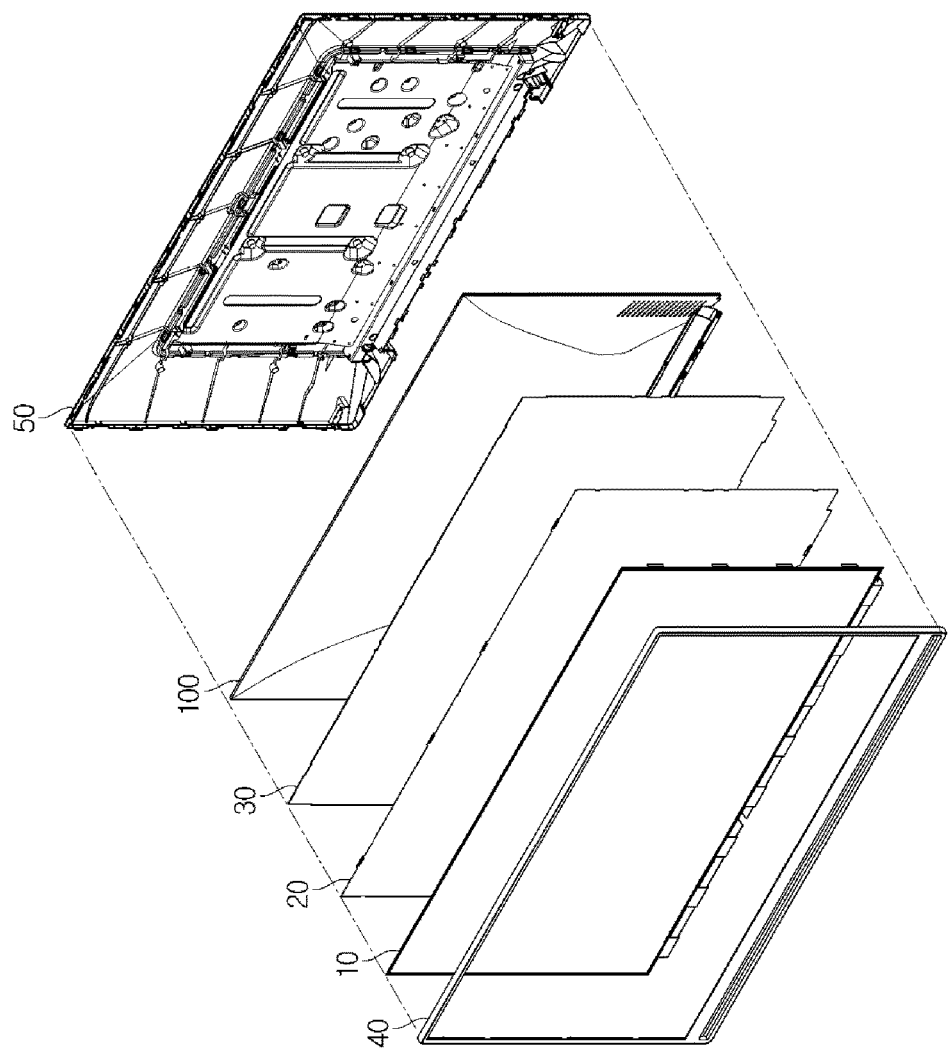
FIG. 2 is an exploded perspective view illustrating an example display apparatus according to an example embodiment of the present disclosure.
Figure 3:
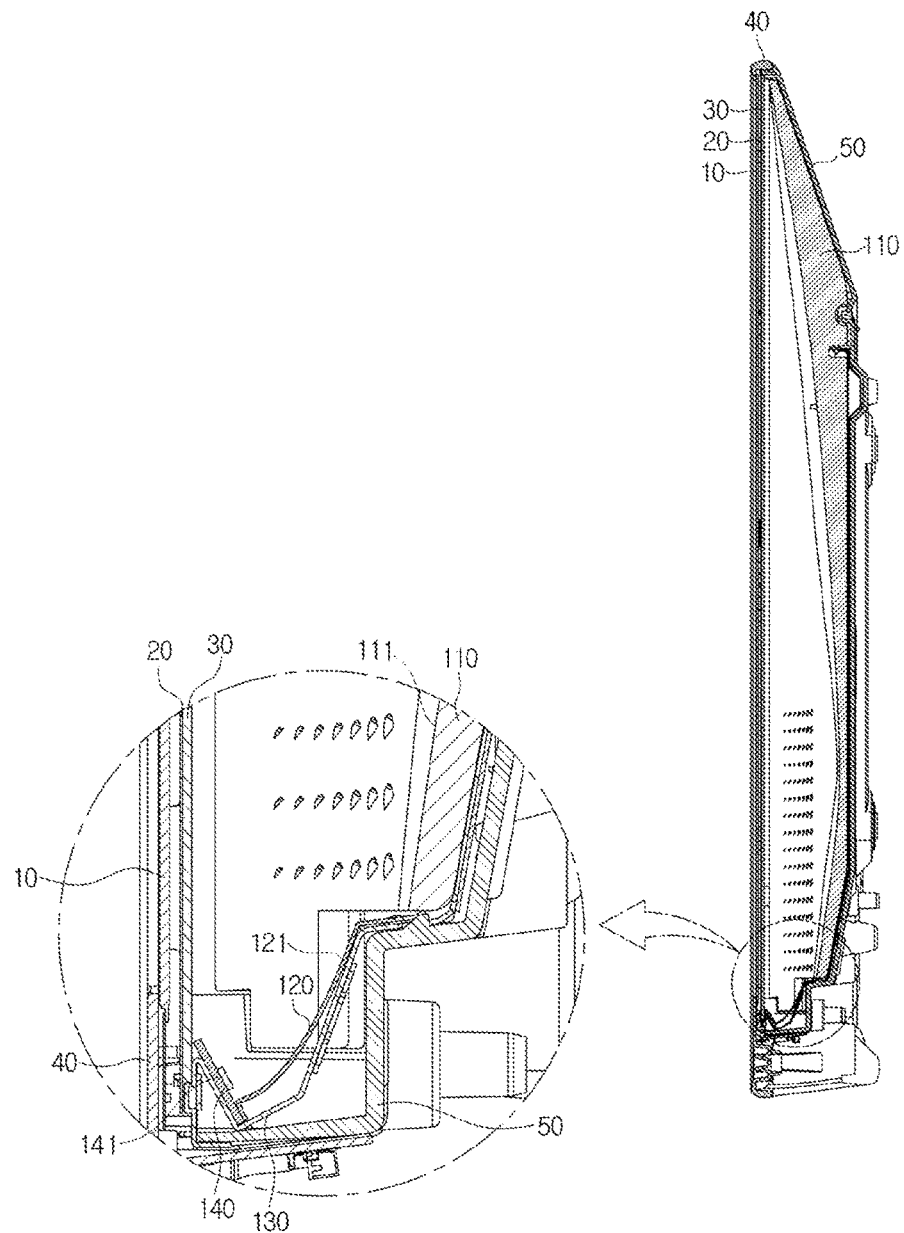
FIG. 3 is a side cross-sectional view illustrating an example display apparatus according to an example embodiment of the present disclosure.
Figure 4:
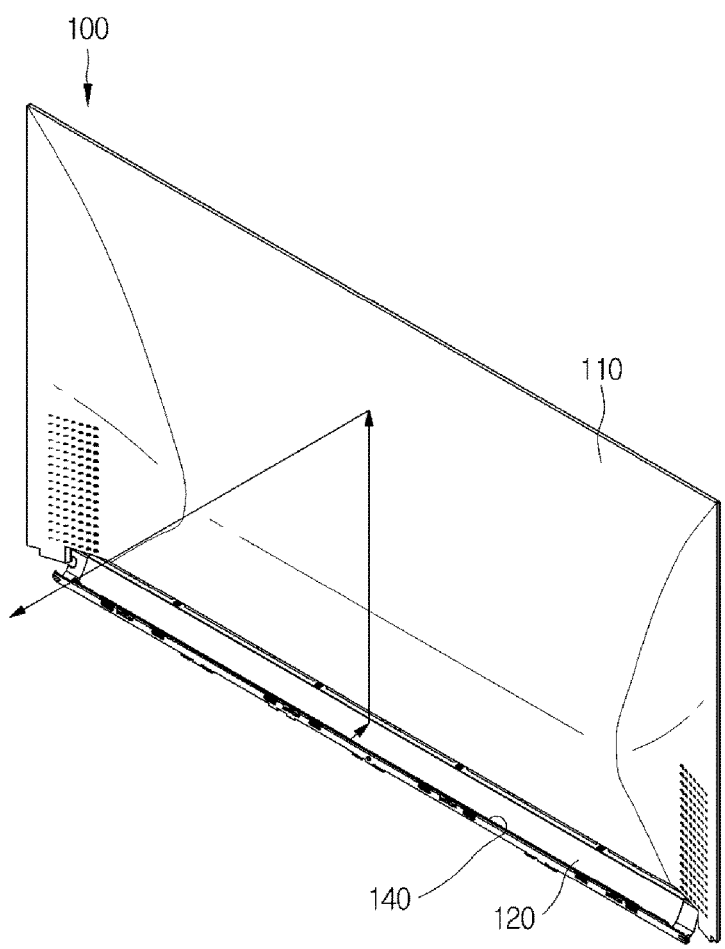
FIG. 4 is a perspective view illustrating an example partial configuration of an example display apparatus according to an example embodiment of the present disclosure.
Figure 5:
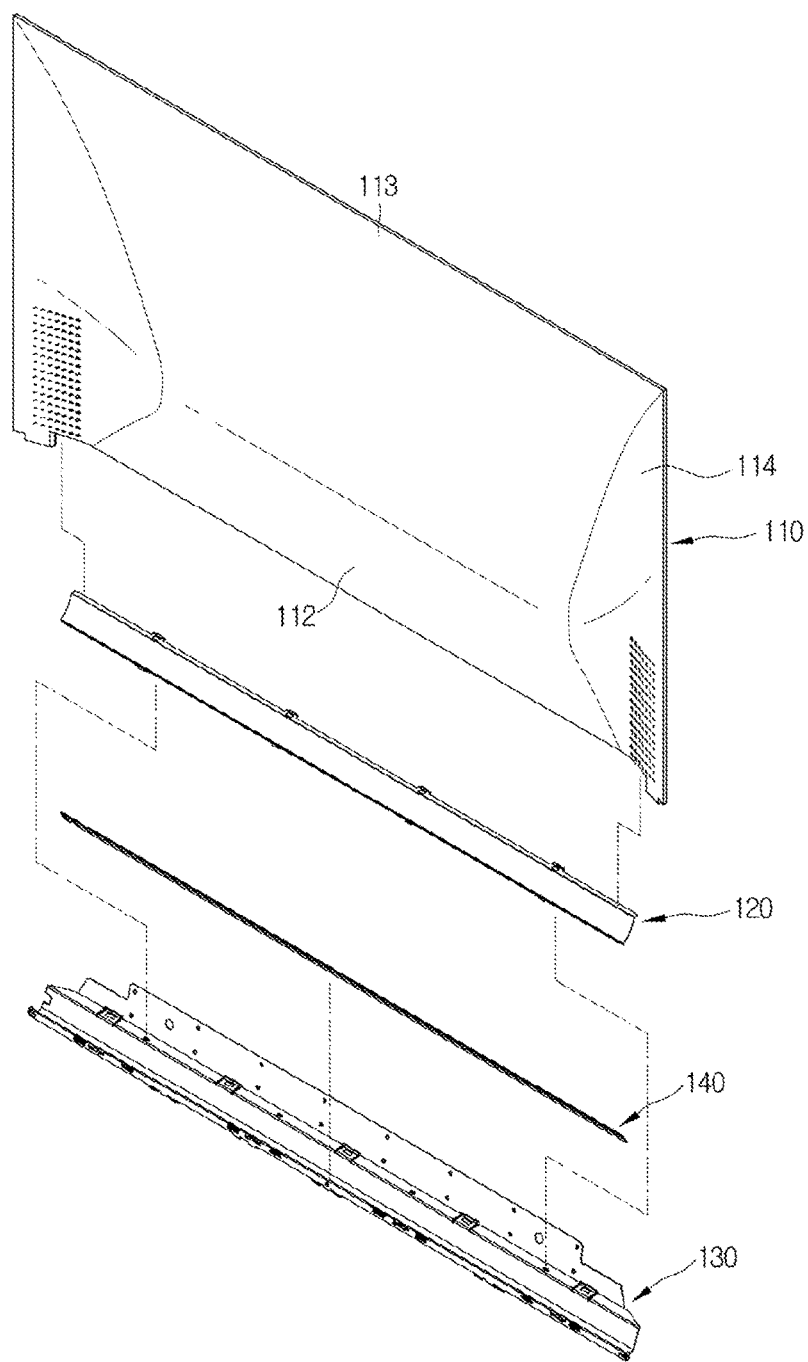
FIG. 5 is an exploded perspective view illustrating an example partial configuration of an example display apparatus according to an example embodiment of the present disclosure.

FIG. 1 is a perspective view illustrating an example display apparatus according to one embodiment of the present disclosure, FIG. 2 is an exploded perspective view of the display apparatus according to an example embodiment of the present disclosure, FIG. 3 is a side cross-sectional view of the display apparatus according to an example embodiment of the present disclosure, FIG. 4 is a perspective view of a partial configuration of the display apparatus according to an example embodiment of the present disclosure, and FIG. 5 is an exploded perspective view of the partial configuration of the display apparatus according to an example embodiment of the present disclosure.

Referring to FIGS. 1 and 2, the display apparatus 1 may include a display panel 10 on which an image is displayed, a diffusion plate 30 disposed at a rear of the display panel 10 to allow light transmitted from a rear side to be diffused and transmitted to the display panel 10 located at a front side, an optical sheet 20 provided between the display panel 10 and the diffusion plate 30 to improve an optical characteristic of the light diffused by the diffusion plate 30, a top chassis 40 coupled to a front side of the display panel 10 and a bottom chassis 50 coupled to a rear side of the top chassis 40 to support the display panel 10. A backlight unit 100 for providing light to the display panel 10 may be disposed at a rear of the diffusion plate 30. Detailed configuration of the backlight unit 100 will be described later.

Also, although not illustrated in the drawings, the display apparatus 1 may further include a middle mold (not shown) coupled between the top chassis 40 and the bottom chassis 50 to support the display panel 10.

The display panel 10 may be configured with a liquid crystal panel in which liquid crystal (not shown) is filled between two glass substrates (not shown).

The optical sheet 20 may include a diffusion sheet for diffusing the light transmitted through the diffusion plate 30, a prism sheet for concentrating the diffused light in a direction vertical to the display panel 10, a protective sheet for protecting the prism sheet and so on.

The top chassis 40 may be disposed at a front surface of the display panel 10 and may be coupled to the bottom chassis 50 disposed at a rear thereof. The display panel 10, the optical sheet 20 and the diffusion plate 30 may be disposed between the top chassis 40 and the bottom chassis 50 and may be supported by the bottom chassis 50 in a space formed by coupling of the top chassis 40 and the bottom chassis 50. Also, although not illustrated, the display panel 10 may be supported by a middle mold (not shown) provided between the top chassis 40 and the bottom chassis 50, and front and rear portions of the middle mold (not shown) may be supported by the top chassis 40 and the bottom chassis 50.

According to an example embodiment of the present disclosure, the top chassis 40 may form an exterior of the front surface of the display apparatus 1 without a separate cover member. However, the present disclosure is not limited thereto, and a front surface cover for covering the top chassis 40 may be separately provided and may form the exterior of the display apparatus 1.

The bottom chassis 50 may be disposed at the rear of the display panel 10 and may support the display panel 10, as described above. Like the top chassis 40, the bottom chassis 50 may form the exterior without a separate cover. Also, although not illustrated, the present disclosure is not limited thereto, and a rear surface cover for forming the exterior of a rear portion of the display apparatus 1 may be separately provided at a rear of the bottom chassis 50.

Referring to FIGS. 3, 4 and 5, the backlight unit 100 may include a board 140 on which a plurality of light sources 141 are installed. The light source 141 may include a light emitting diode (LED) suitable to realize a thin display apparatus.

A backlight unit of a conventional display apparatus was a direct type in which the LED is arranged at a rear area opposite to an entire surface of the display panel and the light is directly emitted, or an edge type in which the LED is disposed at an end surface of a light guide plate, particularly, both side surfaces of the light guide plate and the light is emitted toward an inside of the light guide plate and surface-emitted toward the display panel by the light guide plate.

In the case of the direct type, there is a problem that a LED board corresponding to the entire surface of the display panel and a large number of LEDs are required and a lens for diffusing the light is provided at each of the LEDs and thus a manufacturing cost is increased. In the case of the edge type, there is a problem that an additional light guide plate is required and thus a molding method of a product may be limited and also a thickness of the display apparatus increases due to an insertion of the light guide plate.

To address the problems, in the backlight unit 100 of the display apparatus 1 according to an example embodiment of the present disclosure, the board 140 including the light source 141 is disposed at one side of the display apparatus 1, and the light may be effectively emitted toward the display panel 10 with the minimum light sources 141 using a reflection characteristic of the light instead of the light guide plate.

For example, the backlight unit 100 may include the board 140 on which the plurality of light sources 141 are arranged and a first reflection member 110 and a second reflection member 120 for reflecting the light emitted from the plurality of light sources 141. The second reflection member 120 may reflect at least a part of the light emitted from the plurality of light sources 141 toward the first reflection member 110, and the first reflection member 110 may reflect the light directly incident from the plurality of light sources 141 and the light reflected and incident by the second reflection member 120 toward the display panel 10.

A first reflective surface 111 of the first reflection member 110 may be formed of a material having a diffuse reflection property to disperse the incident light toward the display panel 10, and a second reflective surface 121 of the second reflection member 120 may be formed of a material having a regular reflection property to change a travel direction of the light emitted from the plurality of light sources 141 toward the first reflection member 110. The second reflection member 120 may be formed of a metallic material to use a reflection property of the material and may be used in a state in which a film or a sheet having a strong regular reflection property may be attached to the second reflective surface 121. A material of the light-reflecting surface is not limited.

Since the light sources 141 of the backlight unit 100 are asymmetrically disposed at one side of the display panel 10, brightness at one side of the display panel 10 at which the light sources 141 are disposed may be brighter than that at the other side thereof due to a light sparking phenomenon or the direct emitting of the light sources 141. Therefore, the board 140 on which the light sources 141 are installed may be disposed to be inclined with respect to the display panel 10, such that the light sources 141 are directed toward the second reflection member 120. That is, the board 140 may be disposed to be inclined, such that the light sources 141 are directed toward the bottom chassis 50 located at the rear of the display panel 10.

Preferably, the board 140 may be disposed at a lower side of the display panel 10 and may be disposed to be inclined, such that the light sources 141 are directed toward the rear of the display panel 10, i.e., the bottom chassis 50. Specifically, the board 140 may be disposed to be inclined, such that the light sources 141 are directed toward a rear upper side. The board 140 may be provided in the form of a rectangular plate of which one side extends long and may include an installation surface 142 on which the plurality of light sources 141 are arranged.

The first reflection member 110 may be provided to have a surface area corresponding to the display panel 10 and may be disposed at the rear of the diffusion plate 30, e.g., a front of the bottom chassis 50 so that the light emitted from the light sources 141 disposed at one side of the display panel 10 can be evenly supplied to the entire surface of the display panel 10. Also, the first reflection member 110 may include the first reflective surface 111 provided to be concave toward the display panel 10.

Meanwhile, when the light sources 141 are disposed at one side of the display panel 10, the brightness of the light is gradually reduced from the one side of the display panel 10 toward the other side thereof. In other words, when the light sources 141 are disposed at one side of the first reflective surface 111, an intensity of the light is reduced from the one side of the first reflective surface 111 toward the other side thereof, and thus the second reflection member 120 serves to transmit the light emitted from the light sources 141 to a corresponding portion located at the other side of the display panel 10.

As illustrated in FIG. 4, the second reflection member 120 may be disposed close to the board 140 and may reflect the light emitted from the light sources 141 so that at least a part of the light is directed toward the first reflection member 110.

The second reflection member 120 may be provided in the form of a reflector. The second reflection member 120 may include the second reflective surface 121 disposed at a side facing the light sources 141 and formed to be concave toward the light sources 141 such that the light emitted from the light sources 141 is reflected toward the first reflection member 110.

The second reflective surface 121 of the second reflection member 120 may be disposed so that a concave surface is directed toward not only the light sources 141 but also the first reflective surface 111 of the first reflection member 110. Preferably, the second reflective surface 121 of the second reflection member 120 may be formed in a parabolic curved-surface.

The second reflection member 120 may be disposed at a front lower side of the bottom chassis 50 to correspond to the board 140. The second reflection member 120 may be disposed between the board 140 and the first reflection member 110 in the display apparatus 1 in forward and backward directions and may guide at least a part of the light emitted from the light sources 141 toward the second reflection member 120.

The second reflection member 120 may be installed at the board 140, on which the light sources 141 are disposed, to reflect the strong light close to the light sources 141. Preferably, one side of the second reflection member 120 may be installed at the board 140, and the other side thereof may be coupled to a support member 130 which will be described later. Although not illustrated in the drawings, the second reflection member 120 may be integrally formed with the board 140.

Without being limited to an example embodiment of the present disclosure, the board 140 may be disposed at a left side, a right side or an upper side of the bottom chassis 50 other than the lower side thereof. In this case, the second reflection member 120 may be disposed to correspond to a side at which the board 140 is disposed, and the second reflective surface 121 of the second reflection member 120 may be formed to be concave toward the light sources 141 and the first reflection member 110.

Also, the board 140 may be disposed at not only one side of the bottom chassis 50 but also a plurality of sides thereof and may be disposed at sides facing each other. That is, the board 140 may be symmetrically disposed at the upper and lower sides of the bottom chassis 50 or the left and right sides thereof. In this case, the second reflection member 120 may be provided to correspond to the number of boards 140 and may reflect the light emitted from the light sources 141 disposed on the board 140 toward the first reflection member 110.

Referring to FIG. 5, the backlight unit 100 may include the support member 130 at which the board 140, the first reflection member 110 and the second reflection member 120 are installed. The support member 130 may be disposed at a lower portion of a front surface of the bottom chassis 50 and may be coupled to the bottom chassis 50 to protrude toward the front of the bottom chassis 50.

Without being limited to an example embodiment of the present disclosure, the board 140, the first reflection member 110 and the second reflection member 120 may be supported by a configuration other than the support member 130 and may be configured to be directly installed at the bottom chassis 50. For example, the board 140, the first reflection member 110 and the second reflection member 120 may be installed at a configuration such as the middle mold (not shown) and may be disposed at the front lower side of the bottom chassis 50, and the support member 130 for supporting the board 140, the first reflection member 110 and the second reflection member 120 may be integrally formed with the bottom chassis 50.

According to an example embodiment of the present disclosure, the light emitted from the light sources 141 may be reflected by the first reflective surface 111 disposed at a front surface side of the first reflection member 110 and may be directed toward the display panel 10 but is not limited thereto. The light emitted from the light sources 141 may be directly reflected by the bottom chassis 50 and may be radiated toward the display panel 10.

That is, without a separate configuration such as the first reflection member 110, the bottom chassis 50 may be formed to include the first reflective surface 111. To increase the reflection efficiency of the light, the bottom chassis 50 may be coated with a material different from that of the bottom chassis, and a reflection sheet or the like may be attached to a front surface portion of the bottom chassis 50.

Hereinafter, a process in which the light generated from the light sources 141 is radiated to the display panel 10 or the diffusion plate 30 through the first reflection member 110 and the second reflection member 120 will be described in detail.

Figure 6:
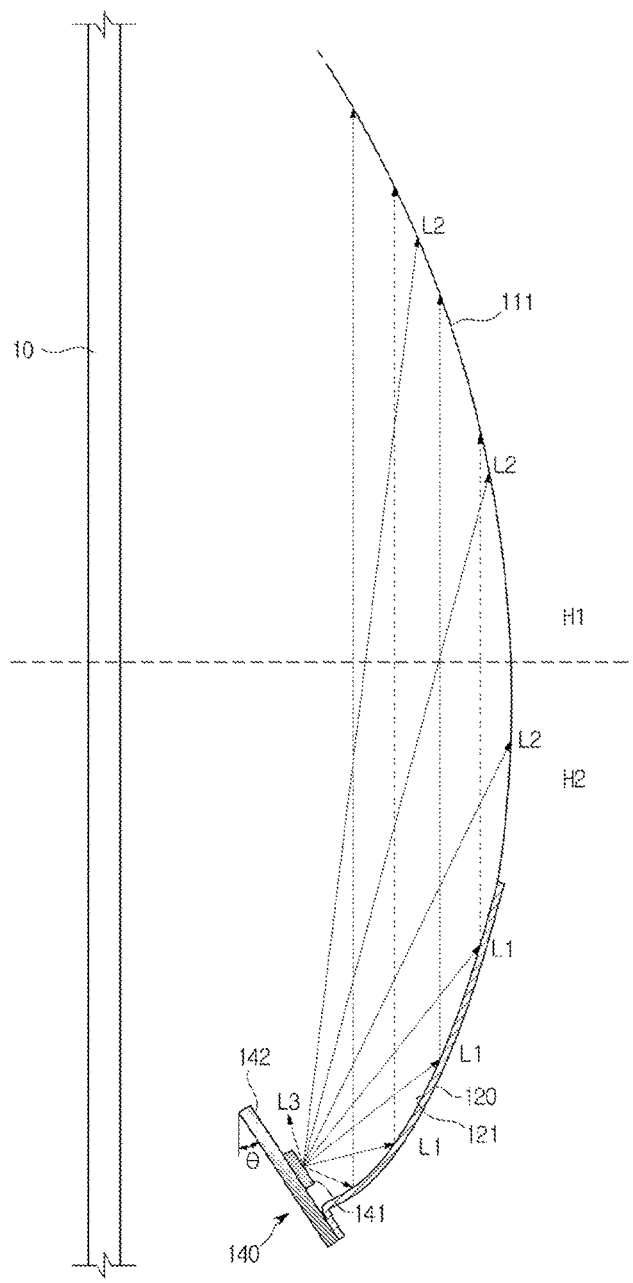
FIG. 6 is a diagram illustrating an example route through which the light is radiated in the display apparatus according to an example embodiment of the present disclosure.

FIG. 6 is a diagram illustrating an example route through which the light is radiated in the display apparatus according to an example embodiment of the present disclosure.

As illustrated in FIG. 6, the board 140 may be disposed so that the light source 141 is directed toward the first and second reflection members 110 and 120. For example, the board 140 may be disposed so that the installation surface 142 of the board 140 is directed toward the bottom chassis 50. Therefore, the installation surface 142 on which the light is radiated may be disposed to be directed toward an opposite side of the display panel 10.

The board 140 may be formed to be inclined, such that the light of the light source 141 can reach an upper portion H1 of the first reflection member 110. An emitting angle of the light from the light source 141 is typically about 120 degrees. This is because an amount of the light which can reach the upper portion H1 of the first reflection member 110 is reduced when the board 140 is disposed in parallel with an extending direction of the first reflection member 110.

Accordingly, the board 140 is disposed to be inclined, and an inclined angle θ with respect to the display panel 10 may, for example, be about 30 degrees. However, the inclined angle is not limited thereto and may be changed variously according to shapes of the first and second reflection members 110 and 120.

As described above, unlike the display apparatus having the conventional edge type or direct type backlight unit, the board 140 is disposed at only one side of the display apparatus 1 having a quadrangular appearance, and thus the amount of the radiated light may be reduced at the other side thereof at which the board 140 is not disposed.

For example, according to an example embodiment of the present disclosure, since the board 140 is disposed at the lower side of the display panel 10, a relatively large amount of the light is radiated to a lower portion H2 of the first reflection member 110 which is one side close to the board 140, but the large amount of the light may not be radiated to the upper portion H1 of the first reflection member 110 which is the other side distant from the board 140.

Therefore, the light radiated to the first reflection member 110 is generally non-uniform, and thus the light reflected by the first reflection member 110 and directed toward the display panel 10 may also be generally non-uniformly radiated to the display panel 10.

That is, the relatively large amount of the light may be radiated to a side of the display panel 10 corresponding to the lower portion H2 of the first reflection member 110 further than a side of the display panel 10 corresponding to the upper portion H1 of the first reflection member 110, and thus the brightness may be differently distributed at an upper side and a lower side of the display panel 10, and a dark portion may be formed at the upper side of the display panel 10 having a lower brightness.

To disperse the light concentrated to the lower portion H2 of the first reflection member 110 to the upper portion H1 thereof, the second reflection member 120 may be disposed between the light source 141 and the first reflection member 110.

The second reflective surface 121 of the second reflection member 120 may be formed to have a concave curved-surface toward the light source 141 and the first reflection member 110 and may reflect the light emitted from the light source 141 toward the first reflection member 110.

For example, the second reflection member 120 reflects regularly at least a part of the light emitted from the light source 141 by the second reflective surface 121, and the reflected light travels in parallel with the display panel 10 due to a concave angle of the second reflective surface 121. Therefore, the second reflection member 120 transmits the light to the other side of the first reflective surface 111, at which the light source 141 is not disposed, while maximally reducing a loss of the light.

The second reflective surface 121 may include the parabolic curved-surface. Also, the light source 141 may be disposed at a focal point of a parabola forming the second reflective surface 121. Also, the first reflection member 110 may be disposed in a direction in which an axis of the parabola of the second reflective surface 121 is directed.

When the light emitted from the light source 141 reaches the second reflective surface 121, the light may be reflected by the second reflective surface 121 in a direction in parallel with the axis of the parabola. This is because the light source 141 is disposed at the focal point of the parabola of the second reflective surface 121, as described above.

Therefore, all of the light L1 reflected by the second reflective surface 121 may be directed in parallel in one direction. The first reflective surface 111 of the first reflection member 110 may be disposed in the axial direction of the parabola of the second reflective surface 121, and all of the light L1 reflected by the second reflective surface 121 may reach the first reflective surface 111 of the first reflection member 110.

For example, the light L1 emitted from the light source 141 toward the second reflective surface 121 may be reflected in the axial direction of the parabola of the second reflective surface 121, may reach the upper portion H1 of the first reflection member 110 and then may be directed toward the display panel 10 by the first reflection member 110.

When the second reflection member 120 is not provided, all of the light corresponding to L1 is radiated to the lower portion H2 of the first reflection member 110, and a very great uniformity difference may occur in the light radiated to the upper portion H1 and the lower portion H2 of the first reflection member 110. However, a part of the light radiated to the lower portion H2 of the first reflection member 110 may reach the upper portion H1 of the first reflection member 110 by the second reflection member 120, and a difference in the amount of light may be offset.

As illustrated in FIG. 6, a part of the light emitted from the light source 141 may be the light L1 directed toward the upper portion H1 of the first reflection member 110 via the second reflection member 120, and the light L2 radiated toward an upper side further than the second reflection member 120 is not directed to the second reflection member 120 but is directly reflected by the first reflection member 110 and may reach the display panel 10. A part of the light L2 may reach the lower portion H2 of the first reflection member 110, and another part thereof may reach the upper portion H1 of the first reflection member 110.

Also, another part of the light emitted from the light source 141 may not be reflected by the first and second reflection members 110 and 120 and may be directly radiated toward the display panel 10.

As described above, since the light source 141 is disposed at a side of the lower portion H2 of the first reflection member 110, a part of the light reaching the lower portion H2 is reflected to the upper portion H1 by the second reflection member 120 to offset the non-uniformity of the light which occurs by a fact that most of the light emitted from the light source 141 reaches the lower portion H2.

As illustrated in FIG. 2, the first reflection member 110 may be provided to correspond to a shape of the bottom chassis 50. The first reflection member 110 may be formed to be concave in all of left and right and upward and downward directions.

Referring to FIG. 4, the first reflective surface 111 of the first reflection member 110 is formed to be concave toward the display panel 10. The first reflective surface 111 may be formed to be concave in the upward and downward directions by an upper reflective surface 113 and a lower reflective surface 112 and may also be formed to be concave in the left and right directions by side reflective surfaces 114 provided at both sides.

Each of the lower, upper and side reflective surfaces 112, 113 and 114 may be disposed to be inclined, such that a central side of the first reflective surface 111 becomes concave toward a rear thereof. Also, each of the lower, upper and side reflective surfaces 112, 113 and 114 may include a curved shape. However, each of the lower, upper and side reflective surfaces 112, 113 and 114 is not limited thereto and may include a linear shape.

The first reflection member 110 may include an expanded polystyrene (EPS) material. A plurality of fine pores may be disposed at a surface area of the EPS material. Therefore, the plurality of fine pores are provided at a surface area of the first reflection member 110, and the light incident on the first reflection member 110 may be diffusely reflected by the plurality of pores and may be directed toward the display panel 10.

Since the light incident on all of the lower, upper and side reflective surfaces 112, 113 and 114 is diffusely reflected and is not reflected toward the display panel 10 while being biased in one direction but is reflected in multi-directions, a density of the light incident toward the display panel 10 may be comparatively evenly formed.

The side reflective surface 114 may be disposed close to the board 140. Accordingly, the amount of the light incident toward the side reflective surface 114 may be greater than that of the light toward the upper reflective surface 113 and the lower reflective surface 112.

When the amount of the light incident on each of the lower, upper and side reflective surfaces 112, 113 and 114 is non-uniform, it is difficult for the light density to be evenly incident on the entire surface of the display panel 10. Therefore, when the plurality of light sources 141 are arranged at regular intervals in a direction of a long side 103 of the board 140, the amount of the light incident on a central side of the display panel 10 may be reduced, and thus there may occur a problem that the dark portion may be formed at the central side of the display panel 10.

To prevent and/or reduce the problem, the plurality of light sources 141 may be disposed on the board 140 to have different distances therebetween in left and right or forward and backward directions. That is, the distances among the plurality of light sources 141 may be provided variously according to a shape of the first reflection member 110.

When the light emitted from the light source 141 is not biased toward one side of the display panel 10 due to the first reflection member 110 and the second reflection member 120 and the uniformity thereof is enhanced, the uniformity of brightness on the display panel 10 may be enhanced, and reliability in performance of the display apparatus 1 may also be increased.

The present disclosure has an effect in which the light emitted from the plurality of light sources is easily dispersed to the entire display panel using the reflective surface of the reflection member without a member such as the light guide plate and thus the uniformity of the light can be enhanced.

Also, since the member such as the light guide plate is not provided, a structure of the display apparatus can be simplified and productivity can be enhanced.

Although various example embodiments of the present disclosure have been illustrated and described, it would be appreciated by those skilled in the art that changes may be made in these embodiments without departing from the principles and spirit of the disclosure, the scope of which is defined in the claims and their equivalents.

What is claimed is:

1. A display apparatus comprising:
a display panel; and
a backlight unit configured to provide light to the display panel,
wherein the backlight unit comprises: a board on which a plurality of light sources are arranged; a first reflection member comprising a first reflective surface configured to diffusely reflect light emitted from the plurality of light sources toward the display panel; and a second reflection member comprising a second reflective surface disposed between the first reflection member and the plurality of light sources and configured to reflect the light emitted from the plurality of light sources toward the first reflection member;
wherein the first reflective surface comprises a polymer based material for diffusely reflecting light toward the display panel, and the second reflective surface comprises a metal based surface for regularly reflecting light from the light sources toward the first reflective surface,
wherein the second reflective surface is configured so that at least a part of the light emitted from the plurality of light sources and reflected toward the first reflective surface by the second reflective surface is parallel to the display panel
wherein the first reflective surface includes an upper reflective surface and a lower reflective surface to be configured to be concave toward the display panel, and
wherein the board is inclined with respect to the display panel so that a part of the light emitted from the plurality of light sources is radiated toward the display panel by being reflected by the lower reflective surface disposed on the upper side of the second reflection member and another part of the light emitted from the plurality of light sources is directly radiated toward the display panel.

2. The display apparatus according to claim 1, wherein the board is inclined with respect to the display panel and the plurality of light sources are directed toward the second reflection member.

3. The display apparatus according to claim 1, wherein the second reflective surface is concave toward the plurality of light sources.

4. The display apparatus according to claim 3, wherein the second reflective surface of the second reflection member has a parabolic curved-surface shape.

5. The display apparatus according to claim 1, wherein the second reflection member is disposed at the board.

6. The display apparatus according to claim 1, wherein the board and the second reflection member are integrally formed with each other.

7. The display apparatus according to claim 1, wherein the backlight unit further comprises a support structure configured to support the board, the first reflection member and the second reflection member.

8. The display apparatus according to claim 7, wherein one side of the second reflection member is disposed at the board, and the other side of the second reflection member is coupled to the support structure.

9. A display apparatus comprising:
a display panel;
a top chassis provided at a front of the display panel;
a board disposed at a rear of the display panel and on which a plurality of light sources are disposed;
a bottom chassis disposed at the rear of the display panel and including a first reflective surface configured to diffusely reflect light emitted from the plurality of light sources toward the display panel; and
a reflection member comprising a second reflective surface and disposed between the first reflective surface and the plurality of light sources, the second reflective surface configured to regularly reflect the light emitted from the plurality of light sources toward the first reflective surface,
wherein the first reflective surface comprises a polymer based material for diffusely reflecting light toward the display panel, and the second reflective surface comprises a metal based surface for regularly reflecting light from the light sources toward the first reflective surface,
wherein the second reflective surface is configured so that at least a part of the light emitted from the plurality of light sources and reflected toward the first reflective surface by the second reflective surface is parallel to the display panel
wherein the first reflective surface includes an upper reflective surface and a lower reflective surface to be configured to be concave toward the display panel, and
wherein the board is inclined with respect to the display panel so that a part of the light emitted from the plurality of light sources is radiated toward the display panel by being reflected by the lower reflective surface disposed on the upper side of the second reflection member and another part of the light emitted from the plurality of light sources is directly radiated toward the display panel.

10. The display apparatus according to claim 9, wherein the board is disposed at one side of the first reflective surface, such that the plurality of light sources are directed toward the bottom chassis.

11. The display apparatus according to claim 10, wherein the board is disposed at a lower side of the bottom chassis and disposed, such that the plurality of light sources are directed toward a rear upper side.

12. The display apparatus according to claim 9, wherein the reflection member is disposed at one side of the board, and the second reflective surface is concave toward the plurality of light sources and the first reflective surface.

13. The display apparatus according to claim 9, wherein the board and the reflection member are disposed at the bottom chassis.

14. The display apparatus according to claim 9, further comprising a support structure protruding toward a front of the bottom chassis,
wherein the board and the reflection member are disposed at the support structure.

15. The display apparatus according to claim 14, wherein the support structure is integrally formed with the bottom chassis.

16. A display apparatus comprising:
a display panel;
a top chassis provided at a front of the display panel;
an optical sheet disposed at a rear of the display panel;
a diffusion plate disposed at a rear of the optical sheet;
a backlight unit disposed at a rear of the diffusion plate; and
a bottom chassis disposed at a rear of the backlight unit,
wherein the backlight unit comprises: a board on which a plurality of light sources are arranged; a first reflection member comprising a first reflective surface configured to diffusely reflect light emitted from the plurality of light sources toward the diffusion plate; and a second reflection member comprising a second reflective surface disposed between the first reflection member and the plurality of light sources and configured to regularly reflect the light emitted from the plurality of light sources toward the first reflection member,
wherein the first reflective surface comprises a polymer based material for diffusely reflecting light toward the display panel, and the second reflective surface comprises a metal based surface for regularly reflecting light from the light sources toward the first reflective surface,
wherein the second reflective surface is configured so that at least a part of the light emitted from the plurality of light sources and reflected toward the first reflective surface by the second reflective surface is parallel to the display panel
wherein the first reflective surface includes an upper reflective surface and a lower reflective surface to be configured to be concave toward the display panel, and
wherein the board is inclined with respect to the display panel so that a part of the light emitted from the plurality of light sources is radiated toward the display panel by being reflected by the lower reflective surface disposed on the upper side of the second reflection member and another part of the light emitted from the plurality of light sources is directly radiated toward the display panel.

17. The display apparatus according to claim 16, wherein the board is inclined, such that the plurality of light sources are directed toward the second reflection member, and
the first reflective surface is concave toward the diffusion plate, and
the second reflective surface is concave toward the plurality of light sources and the first reflection member.

18. The display apparatus according to claim 17, wherein the first reflection member reflects the light emitted from the plurality of light sources and the light reflected by the second reflection member toward the diffusion plate.

* * * * *